(12) United States Patent
Coats et al.

(10) Patent No.: US 7,175,893 B2
(45) Date of Patent: Feb. 13, 2007

(54) CORROSION PROTECTION METHOD

(75) Inventors: Deane M. Coats, Sacramento, CA (US); Robert A. Reis, Folsom, CA (US)

(73) Assignee: State of California, Department of Transportation, Sacramento, CA (US)

( * ) Notice: Subject to any disclaimer, the term of this patent is extended or adjusted under 35 U.S.C. 154(b) by 0 days.

(21) Appl. No.: 10/846,966

(22) Filed: May 13, 2004

(65) Prior Publication Data

US 2005/0255279 A1 Nov. 17, 2005

(51) Int. Cl.
*B65B 53/00* (2006.01)
(52) U.S. Cl. ............... 428/34.9; 428/375; 428/36.9; 427/376.2; 427/318; 427/419.1; 52/740.1; 174/546; 148/279
(58) Field of Classification Search ........... 428/375, 428/34.9, 36.9, 383; 52/726.1, 740.1, 309.15, 52/309.16; 427/376.2, 318, 419.1; 174/546; 148/279
See application file for complete search history.

(56) References Cited

U.S. PATENT DOCUMENTS

| | | | |
|---|---|---|---|
| 3,610,291 A | 10/1971 | Heslop et al. | |
| 5,714,093 A * | 2/1998 | Heimann et al. | 252/389.62 |
| 5,871,668 A * | 2/1999 | Heimann et al. | 252/389.62 |
| 6,106,741 A * | 8/2000 | Heimann et al. | 252/389.3 |
| 6,265,065 B1 * | 7/2001 | McCallion | 428/375 |
| 6,399,021 B1 * | 6/2002 | Heimann et al. | 422/7 |

* cited by examiner

*Primary Examiner*—Merrick Dixon
(74) *Attorney, Agent, or Firm*—Heisler & Associates

(57) ABSTRACT

A corrosion protection covering method for spliced regions of reinforcing steel is disclosed. The covering may include an outer, heat shrinkable layer and a flowable inner layer. The covering is applied to the spliced region, and then heated, causing the outer layer to constrict and thereby seal the taped area. The heat also causes the inner layer to liquify and fill any voids.

16 Claims, 5 Drawing Sheets

CORROSION PROTECTION METHOD

BACKGROUND OF THE INVENTION

1. Field of the Invention

This invention relates to materials, devices, and methods for corrosion protection.

2. General Background

Reinforcing steel members are used in a number of applications, including "rebar" in concrete. But the steel tends to corrode when it comes into contact with chlorides, such as from deicing salts or sea water.

To protect the reinforcing steel against corrosion, it may be covered with fusion-bonded epoxy coatings. Fusion-bonded epoxy coatings are applied as a powder under controlled temperature conditions at a coating facility. The powder is typically electrostatically applied to reinforcement that has been cleaned and grit-blasted to remove surface contaminants and to provide a uniform blast anchor profile. After grit-blasting, reinforcing bars are heated to approximately 232° C. (450° F.) and the powder is applied. The powder fuses to the heated bar surface and cures as the reinforcing bars cool to room temperature. A combination of water and air cooling may be used to control the rate of epoxy curing. As an alternative to electrostatic spraying of epoxy powder material, reinforcing steel may be dipped into a fluidized bed of epoxy/powder after the bar is heated.

These coatings work well to protect most of the reinforcing element, but they are often ineffective in protecting the splice or joint between two adjoined pieces of reinforcing steel. These splices or joints can be created by a mechanical coupler or by welding. In either case, corrosion protection is required. Mechanical coupler splices are typically applied bare, without fusion-bonded epoxy coatings. Similarly, the bare metal of a weld splice needs protection. Also, the heat from welding can damage the epoxy coating on adjacent portions of the rebar.

Epoxy, paint, or other coatings can be hand-applied to the spliced region, but this process is problematic, since such coatings can be difficult to apply by hand, and since they require additional surface preparation. Also, hand-applied coatings often fail to provide adequate protection. In addition, field applied paints and epoxies require cure time prior to handling and have limited application windows that depend on the environmental conditions such as humidity and temperature.

To overcome the problems of hand-coating, heat shrinkable corrosion protection sleeves have been developed, such as those revealed in U.S. Pat. Nos. 6,265,065 and 3,610,291. However, these sleeves suffer from a number of disadvantages. First, because there is no way to tension the sleeves, there may be gaps at the end, even after the sleeves have been heated. Second, because they are pre-cut before application, problems can arise if the sleeves are cut to the wrong length for a particular splice region. For instance, if a sleeve is cut too short, there is no way to add "more" of the sleeve to protect the uncovered area. Third, because every sleeve has a relatively fixed diameter, these sleeves cannot easily be adapted to splice regions of varying diameter. Thus, for any given job site, workers might need to bring a plurality of sleeves of varying diameters. Fourth, the sleeves are prone to contamination, since they are typically installed in batches, and then heated in batches. During the time between installation and heating (which may be substantial), the sleeves are just hanging in the spliced region, and contaminants may fall in. Therefore, there is a need for a material or product that can conveniently and effectively protect spliced regions from corrosion, without the disadvantages of the prior art.

SUMMARY OF THE INVENTION

The present invention is a method of using wrappable heat-shrinkable coverings to provide corrosion protection to reinforcing elements that are placed in concrete or similar materials.

DETAILED DESCRIPTION

Figure 1:
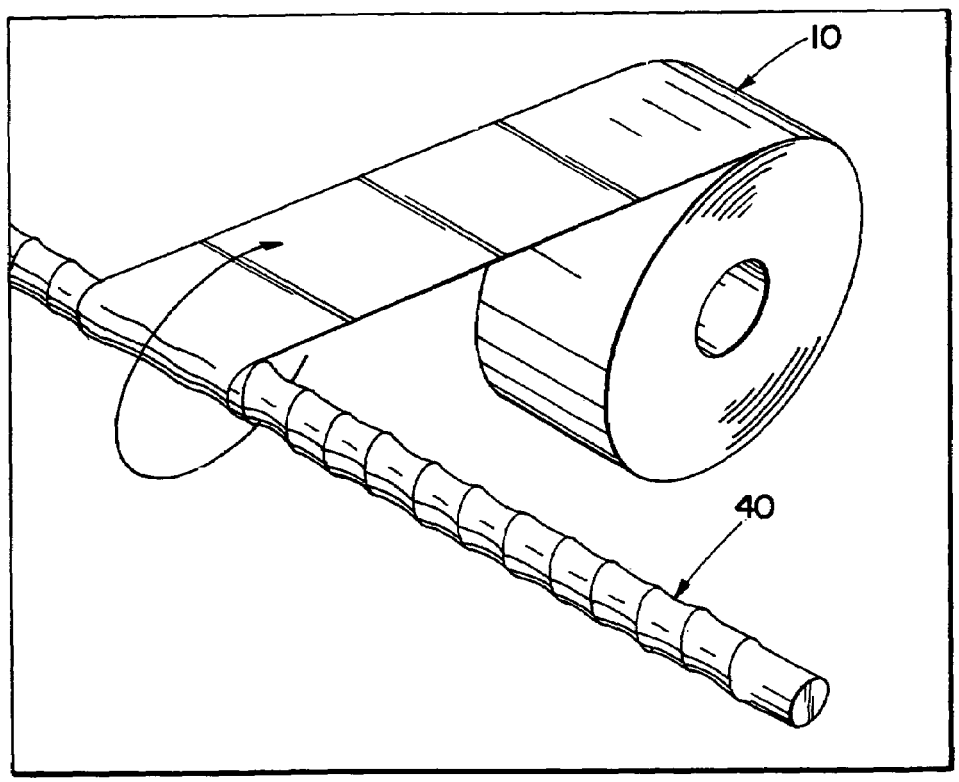
FIG. 1 is an environmental perspective view of a corrosion protection covering as it is being applied to protect a butt weld, according to an embodiment of the present invention.
Figure 2:
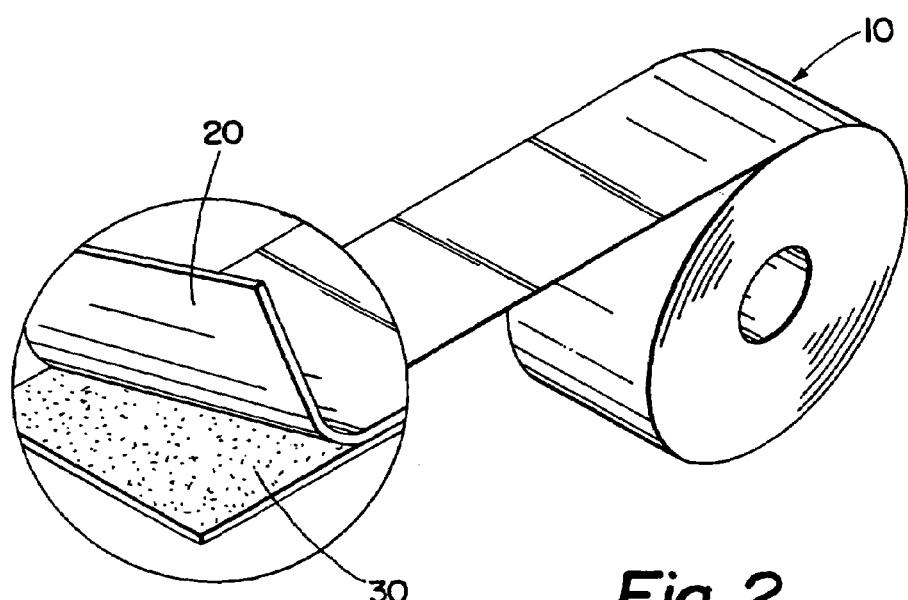
FIG. 2 is a close-up perspective view of a corrosion protection covering according to an embodiment of the present invention.
Figure 3:
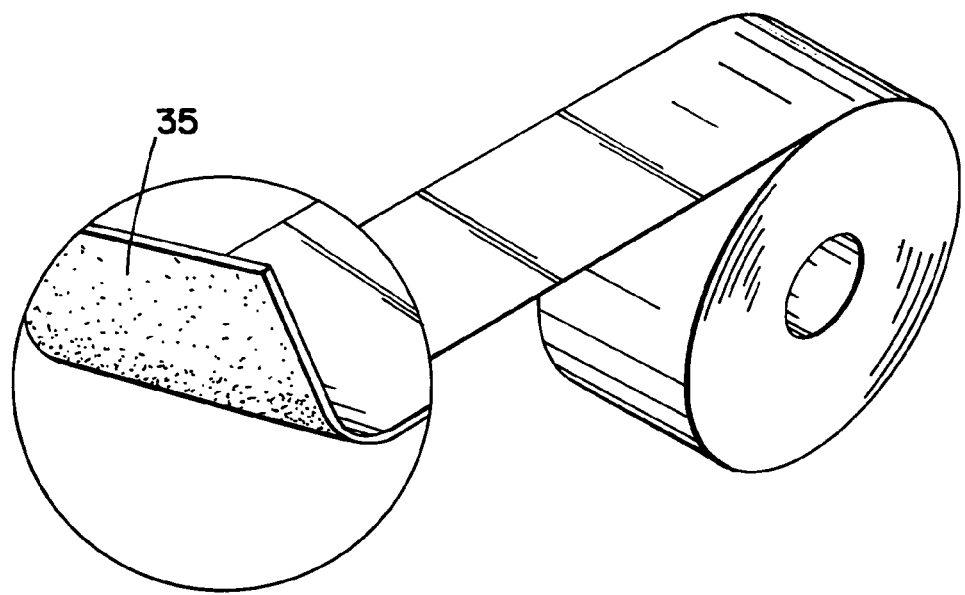
FIG. 3 is a close-up perspective view of a filler tape according to an embodiment of the present invention.

The present invention is a method of protecting the spliced region of a reinforcing element that is placed in concrete or other abrasive material. This method includes the use of a heat-shrinkable corrosion protection covering 10, and also the use of a filler tape 35 in appropriate circumstances. The covering 10 has an outer layer 20 of heat shrinkable material, and an inner layer 30 of flowable material. Additional layers could also be added. See FIGS. 1 and 2. The filler tape 35 only has a single layer of heat flowable material. See FIG. 3.

The outer layer 20 of the covering 10 should be made of a heat-shrinkable material, including but not limited to flexible, irradiated, and cross-linked, low density polyethylene or stretchable and heat shrinkable polyolefin or polyamide. The outer layer will typically be relatively thin, and in one embodiment is about 0.5 mm thick. The outer layer 20 should be sufficiently durable so that it can withstand casting in concrete. The inner layer 30 should be made of a material that flows or liquifies when heated, including but not limited to heat sensitive semi-crystalline polymer mastic.

The process for applying the covering 10 is described below. However, in order to better understand the advantages of the present invention, some background information on splicing technology is provided. For purposes of the present patent, "spliced region" shall generically refer to a region in which two pieces of any reinforcing material (such as steel) are conjoined, by a coupler, welding, or any other means.

Fusion-bonded epoxy-coated reinforcing steel 40 used in reinforced concrete structures may be coupled using several different splicing methods. Splicing methods include butt-weld splices, lap-weld splices, and mechanical coupling devices such as swaged-sleeve couplers or threaded couplers. Mechanical coupling devices 50 are depicted in FIGS. 4–9, and FIG. 10 depicts an exemplary weld 60, namely a lap weld.

For welded applications, fusion-bonded epoxy coatings are typically removed from the area to be welded with the use of power wire brushes. Fusion-bonded epoxy coatings may also need to be removed for mechanical coupling devices, depending on the design of the coupler.

Before the covering 10 can be applied, the splice region should be free of loose debris, and this debris may be removed by hand-wire brushing. Only areas within the limits of the corrosion protection covering should be brushed. Sharp edges or protrusions that may damage the corrosion protection covering must be removed.

Prior to applying the corrosion protection covering 10, the covering 10 may be cut to a length that is sufficient to cover the spliced region and provide the required overlap lengths. Cutting the tape wrap to the specified length also facilitates wrapping so that the applicator does not need to hold an entire roll of tape wrap during application.

After cleaning, heat is applied to the spliced region and surrounding area on either side of the splice to a distance of approximately two times the width of the corrosion protection covering wrapping material. Heat should be applied using a gas flame source or electric heat gun. Gas flame heating should be performed using a "low-heat" heating tip such as a rosebud heating tip. Torch cutting tips should not be used, since these tips produce concentrated, "high-heat" flames that may damage the fusion-bonded epoxy coating or corrosion protection covering. Heat should be applied over the entire splice region and on all sides uniformly until the surface reaches a temperature between 40° C. and 60° C. (100° F. and 140° F.). Temperature range should be monitored with the use of a thermal temperature sensing device such as electronic heat sensor or melting stick. Because it is wrappable, the corrosion protection covering 10 of the present invention can produce satisfactory results with a lower pre-heating temperature than is typically used with corrosion protection tubes or sleeves.

Figure 4:
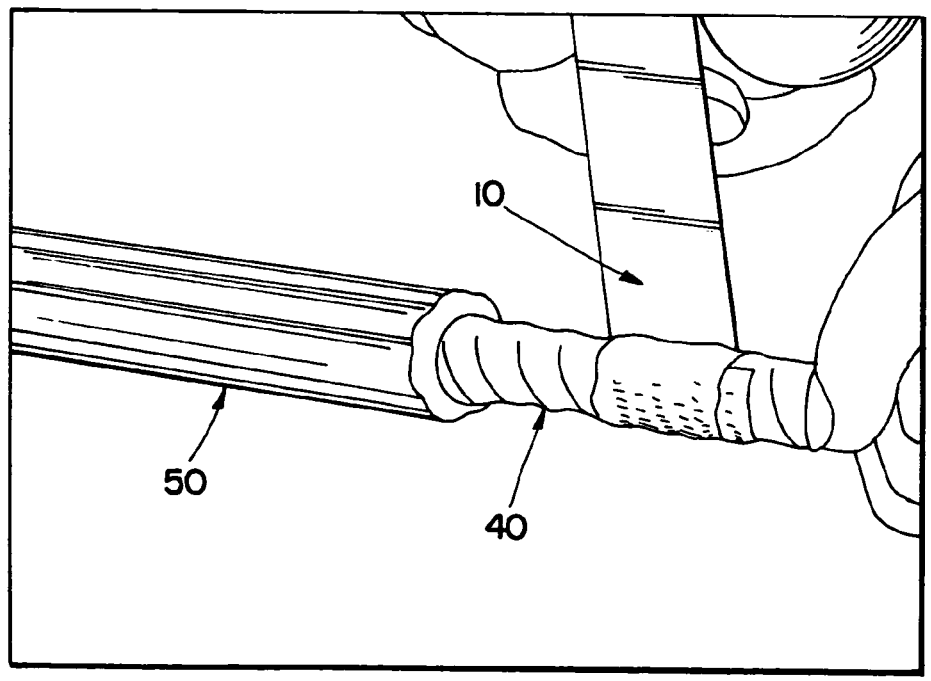
FIGS. 4–6 depict the sequence of applying a corrosion protecting covering to a spliced region containing a mechanical coupler, according to an embodiment of the present invention.
Figure 5:
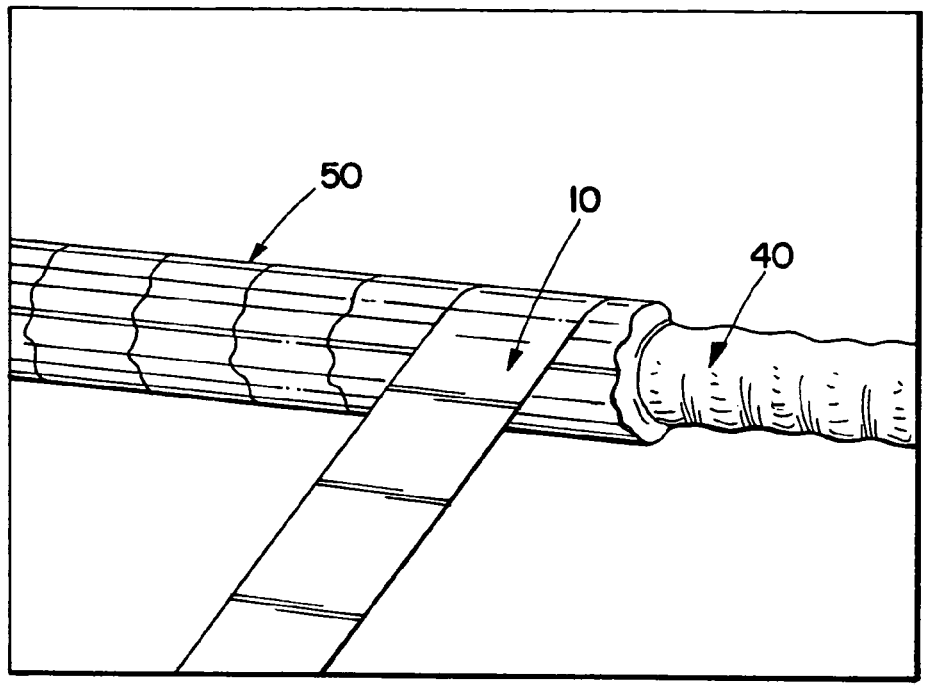
Figure 6:
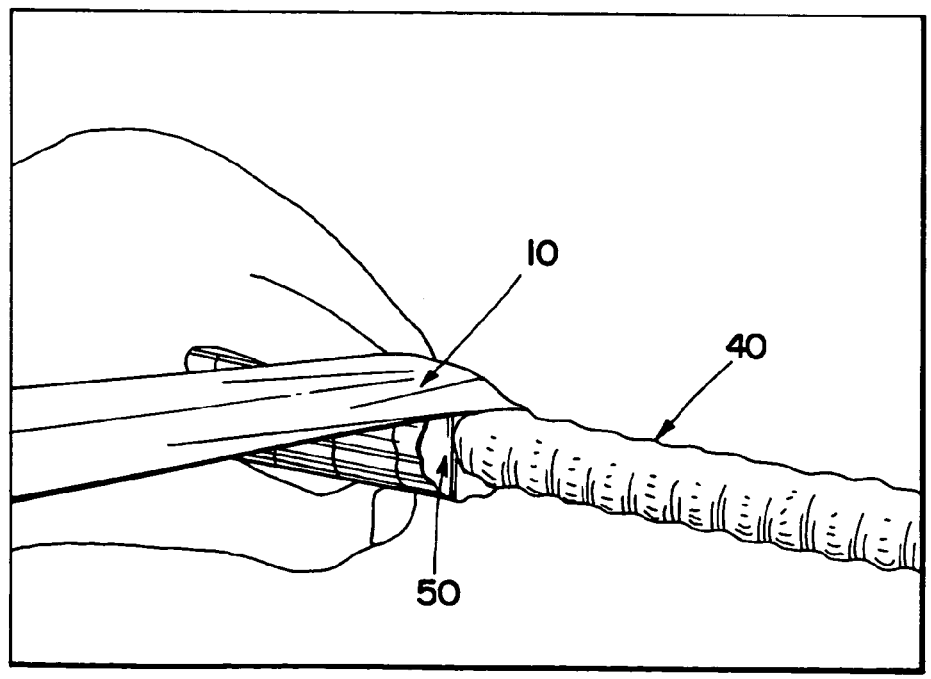
Figure 7:
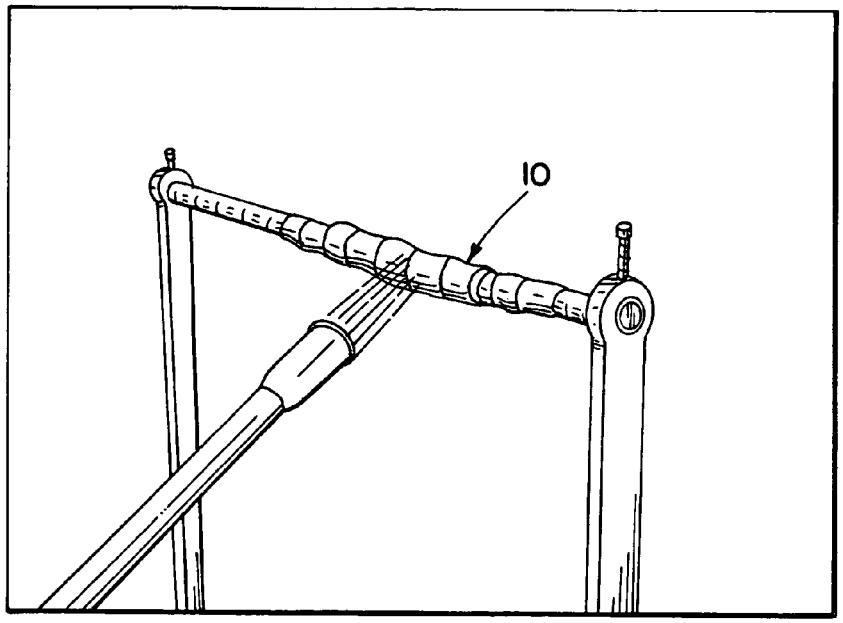
FIG. 7 depicts the heating in a testing stand of a mechanical coupler that has been covered with a corrosion protecting covering according to an embodiment of the present invention.
Figure 8:
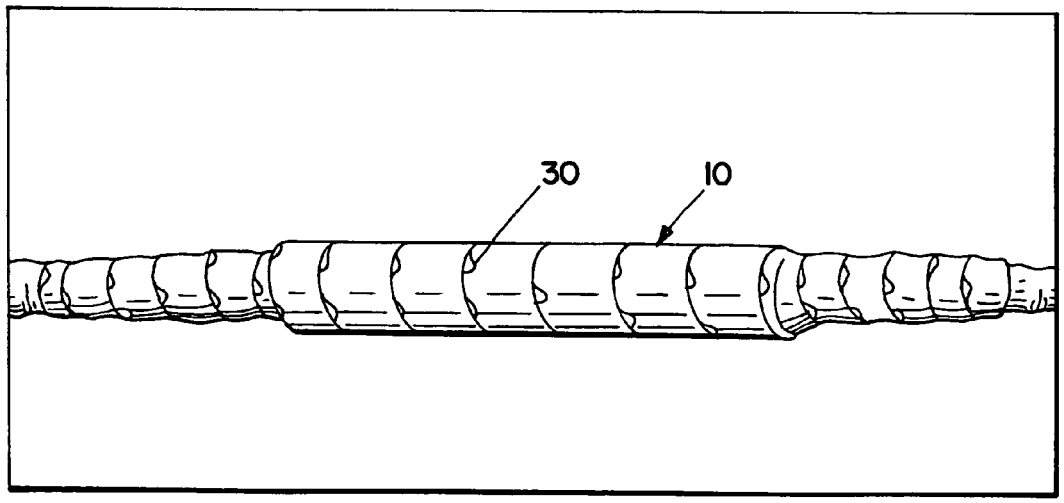
FIG. 8 depicts the heated mastic flowing out of the covering as shown in FIG. 7.
Figure 9:
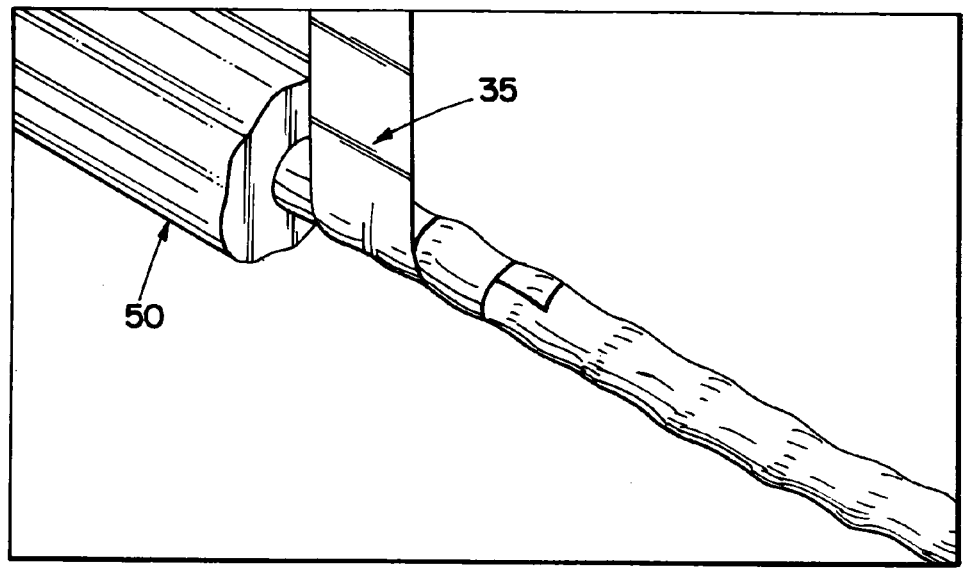
FIG. 9 depicts the first step of the application of a filler tape according to an embodiment of the present invention.
Figure 10:
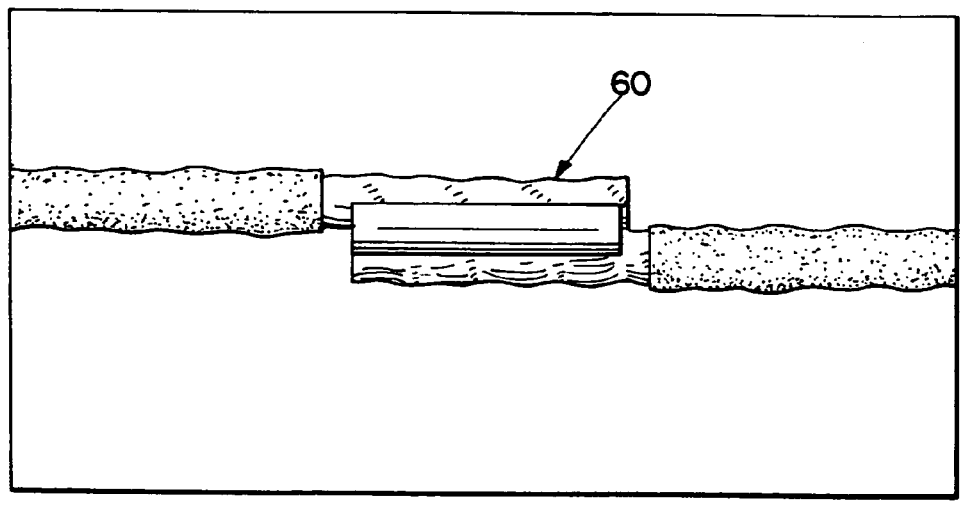
FIG. 10 depicts a weld-splice of adjacent sections of reinforcing steel.

After the correct temperature is achieved the corrosion protection covering 10 is applied. FIGS. 4, 5, and 6 depict application of the wrappable covering 10. Application of the wrappable covering should begin on the fusion-bonded reinforcing element 40, approximately two tape widths beyond the end of the weld splice or mechanical coupler splice. See FIG. 4. The start of the wrap includes one full width overlap of tape plus one-half width overlap to "lock" the wrapping material to the reinforcing steel. Successive wraps are made at a slight angle to the initial wrap and with a one-half width overlap to cover the entire splice region. The covering 10 should be pulled tight and under tension to avoid loose wraps around the splice. Pulling tight on the covering 10 should slightly stretch the material. Wrapping should be continuous. If the wrapping material breaks prior to completing the wrap, it should be removed. Successive wraps should be added until the material extends one and one-half wrap widths beyond the opposite end of the splice. The wrap is terminated with one full-width wrap overlap to "lock" the covering in place prior to the application of heat shrinking.

After wrapping, heat is applied uniformly and continuously to the outside wrapped surface, to all sides, to initiate shrinkage of the covering onto the spliced region. See FIG. 7. When heat is applied, the inner layer 30 of mastic becomes molten and flows along the surface of the mechanical coupler or weld splice. The outer, shrinkable layer 20 contracts with heat around the coupler and reinforcing steel 40 and presses the mastic into any void spaces under the wrapping, providing a barrier to chlorides, moisture, and oxygen. Shrinkage of the covering 10 is complete when the inner mastic lining 30 flows out slightly from between all overlap locations and including the initiation and termination ends of the wrap. See FIG. 8. The heat source should be between the range of 77° C. and 87° C. (170° F. and 190° F.). The covering 10 must be allowed to cool to ambient temperature before coming into contact with other objects.

For many applications, it will be sufficient to use only the covering 10, but a preliminary wrapping of filler tape 35 may be necessary in some circumstances. Mechanical coupler splices 50 are available in various types and configurations (e.g., sleeve-swaged type coupler splice and sleeve tapered threaded transition coupler splice). The shape and size of the coupler splice may vary depending on the type and configuration of coupler splice selected for an application. When the outside diameter of a mechanical coupler splice (after splicing) exceeds 170% of the bar diameter, a preliminary wrapping of filler tape 35 may be used. See FIG. 9. This tape 35 acts as a mastic filler near the ends of the coupler splice, and it may be composed of a 100% solid butyl rubber compound capable of withstanding a service temperature of 66° C. (150° F.). The filler tape 35 facilitates a smooth transition of the tape wrap from the reinforcing bar to the coupler splice and eliminates the possibility of voids occurring at or near the ends of the splice.

Before the development of the present invention it was not known whether corrosion protection wraps could withstand the abrasion and other stress that result from placement in concrete and similar abrasive material. However, an inventor has conducted a test in which a wrappable covering according to an embodiment of the present invention was applied to the spliced region of a steel reinforcing member, and then concrete was poured over the area. The inventor then cut open the concrete, and determined that, unexpectedly, the tape was not adversely affected by the process.

One skilled in the art will appreciate that the present invention can be practiced by other than the preferred embodiments, which are presented for purposes of illustration and not of limitation. Specifically, although the present invention has been described primarily in the context of protecting reinforcing elements in concrete, it can also be used to protect any corrosion-prone element that is placed in at least one abrasive material. For purposes of this patent, "element" shall refer to any member, part, bar, pipe, cable, structure, or component.

We claim:

1. A method of protecting a spliced region of an element against corrosion, comprising:
   providing a first wrappable covering with a heat-shrinkable outer layer and a flowable inner layer;
   applying said covering to said spliced region;
   heating said spliced region after applying said covering; and
   surrounding said spliced region with an abrasive material after applying said covering.

2. The method according to claim 1, wherein said abrasive material is concrete.

3. The method according to claim 2, wherein said element is rebar.

4. The method according to claim 1, additionally comprising the step of:
concluding the heating step when said inner layer is observed to be flowing out of all overlap portions of said first covering.

5. The method according to claim 1, additionally comprising the steps of:
providing a wrappable filler material;
applying said wrappable filler material to said element before applying said covering.

6. The method of claim 1, wherein said inner layer comprises a polyolefin.

7. The method according to claim 1, additionally comprising the step of:
pulling said covering under tension during the step of applying said covering to said spliced region.

8. The method according to claim 1, additionally comprising heating said spliced region before applying said covering.

9. A method of protecting a spliced region of rebar, comprising:
providing a wrappable covering with a heat-shrinkable outer layer and a flowable inner layer;
applying said covering to said spliced region;
heating said spliced region;
concluding the heating step when said inner layer is observed to be flowing out of overlap portions of said covering; and
surrounding said spliced region with concrete material after applying said covering.

10. A reinforced structure, comprising:
at least two reinforcing elements conjoined to each other;
a wrappable covering with a heat-shrinkable outer layer and a flowable inner layer applied to at least some portion of each of said elements; and
an abrasive material surrounding at least a substantial part of said reinforcing elements.

11. The structure according to claim 10, wherein said abrasive material is concrete.

12. The structure according to claim 11, wherein said elements are rebar.

13. The structure according to claim 10, additionally comprising a wrappable filler adjacent to at least some portion of one of said elements.

14. The structure according to claim 10, wherein at least a substantial portion of each of said elements has been pre-coated with epoxy.

15. The structure according to claim 10, wherein said elements are conjoined by welding.

16. The structure according to claim 10, wherein said elements are conjoined by a mechanical coupler.

\* \* \* \* \*